(12) United States Patent
Cook

(10) Patent No.: US 9,781,879 B2
(45) Date of Patent: Oct. 10, 2017

(54) TIMING APPARATUS FOR SEPARATELY DRIVEN SICKLE KNIVES

(75) Inventor: Joel T. Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 538 days.

(21) Appl. No.: 14/128,061

(22) PCT Filed: May 25, 2012

(86) PCT No.: PCT/US2012/039654
§ 371 (c)(1),
(2), (4) Date: Dec. 20, 2013

(87) PCT Pub. No.: WO2012/166629
PCT Pub. Date: Dec. 6, 2012

(65) Prior Publication Data
US 2014/0245713 A1    Sep. 4, 2014

Related U.S. Application Data

(60) Provisional application No. 61/491,080, filed on May 27, 2011.

(51) Int. Cl.
| | |
|---|---|
| *A01D 34/30* | (2006.01) |
| *F16H 21/44* | (2006.01) |
| *A01D 34/00* | (2006.01) |
| *A01D 34/04* | (2006.01) |

(52) U.S. Cl.
CPC .......... *A01D 34/006* (2013.01); *A01D 34/04* (2013.01); *A01D 34/30* (2013.01); *F16H 21/44* (2013.01)

(58) Field of Classification Search
CPC ...... A01D 34/13; A01D 34/002; A01D 34/02; A01D 34/037; A01D 34/30; F16H 21/00; F16H 21/44
USPC .......... 56/158, 296, 12.6, 17.6, 297; 74/595, 74/22 A, 25, 55
See application file for complete search history.

(56) References Cited

U.S. PATENT DOCUMENTS

| | | |
|---|---|---|
| 1,511,501 A | 10/1924 | Campbell |
| 2,051,862 A | 8/1936 | Kaplan |
| 3,413,901 A * | 12/1968 | Lusk ..................... E01C 23/026 404/87 |

(Continued)

FOREIGN PATENT DOCUMENTS

DE           1239515       *   4/1967

Primary Examiner — John G Weiss
(74) Attorney, Agent, or Firm — Peter K. Zacharias; Patrick M. Sheldrake

(57) ABSTRACT

A timing apparatus for sickle knives having adjacent knife ends, respectively, having an endless elongate element encircling and movable about spaced apart support elements such that first and second portions of the elongate element span a space between the support elements, and connector elements connecting the knife ends to the first and second portions of the elongate element, respectively, such that movement of the elongate element in a first direction about the support elements will move the knives in timed relation in first opposite cutting directions, and movement of the elongate element in a second direction opposite the first direction will move the knives in timed relation in second opposite cutting directions. The apparatus can be connected between separately drive knives for timing their motions, or for using one of the knives for timingly driving another of the knives.

20 Claims, 4 Drawing Sheets

(56) References Cited

U.S. PATENT DOCUMENTS

| | | | |
|---|---|---|---|
| 3,434,440 A * | 3/1969 | Meyer, Jr. | D05B 41/00 |
| | | | 112/10 |
| 3,508,388 A * | 4/1970 | Buchholz | A01D 34/13 |
| | | | 56/297 |
| 3,652,793 A | 3/1972 | Farr et al. | |
| 4,111,240 A * | 9/1978 | Mallard | D03D 47/273 |
| | | | 139/446 |
| 4,815,265 A | 3/1989 | Gunn | |
| 4,866,921 A | 9/1989 | Nagashima et al. | |
| 4,910,946 A | 3/1990 | Underwood | |
| 5,157,906 A | 10/1992 | Abrahamson | |
| 5,497,605 A | 3/1996 | Underwood et al. | |
| 6,314,707 B1 | 11/2001 | Ryan | |
| 6,889,492 B1 | 5/2005 | Polk et al. | |
| 7,401,458 B2 | 7/2008 | Priepke | |
| 7,520,118 B1 | 4/2009 | Priepke | |
| 7,658,059 B2 | 2/2010 | Majkrzak | |
| 7,730,709 B2 | 6/2010 | Priepke | |
| 7,805,919 B2 | 10/2010 | Priepke | |
| 7,810,304 B2 | 10/2010 | Priepke | |

\* cited by examiner

US 9,781,879 B2

TIMING APPARATUS FOR SEPARATELY DRIVEN SICKLE KNIVES

This application is the US National Stage for International Application No. PCT/US12/39654, filed on May 25, 2012, which itself is related to and claims the benefit of U.S. Provisional Application No. 61/491,080 filed May 27, 2011.

TECHNICAL FIELD

This invention relates generally to timing apparatus for end to end related sickle knives of a harvesting machine such as a combine or forage harvester, or a windrower, mower, or other plant cutting machine, and more particularly, which is simple, robust and can have a low vertical profile, so as to be accommodated in close relation to the knives and provide timed reciprocating action thereof.

BACKGROUND ART

The disclosure of U.S. Provisional Application No. 61/491,080, filed May 27, 2011, is hereby incorporated herein in its entirety by reference.

Many harvesting machines and mowers utilize reciprocating sickle cutters for severing plant material from the ground. A trend has been to increase the overall width of these machines to an extent such that two or more of the cutters are employed in end to end relation. The cutters are typically driven from opposite ends to effect the cutting action, by mechanical or fluid driven mechanisms, such as a crank, epicyclic, or wobble drive. The cutters typically comprise an elongate, end to end assembly of cutter knives, which are attached at one end to the drive, for longitudinal reciprocating movement relative to longitudinally spaced, stationary blades or guards.

The sickle bar, which may weight as much as 60 pounds or more, typically must accelerate and decelerate two times per cycle as a result of the reciprocal movement. A typical speed for the sickle bar is up to about 16 hertz or cycles per second. The back and forth motion at a high cycle per second generates high acceleration values and high deceleration values that in turn generate high forces on the structural components. These high back and forth forces can have at least two negative effects, vibration at the sickle drive system that may be transmitted to other components of the machine causing discomfort for the operator, and fatigue failure of the structural components themselves. Also, when a sickle knife has a long length, the connecting structure for supporting and driving the knife must be more robust and heavy.

One proposed solution to the vibration problem is a timing shaft that extends between the different sickle drives and keeps them in time to cancel the vibration. However, this is costly and typically involves gears and shafts or timed belts and doesn't integrate well with fluid driven systems. Another proposed solution is a common drive, as disclosed in Abrahamson U.S. Pat. No. 5,157,906, but this would also require a very long connecting element for long sickle knives. Still another proposed solution, which eliminates the need for lengthy connecting apparatus, utilizes a rack and pinion mechanism connecting the knives. Reference in this regard, Polk et al., U.S. Pat. No. 6,889,492 B1. However, a simpler solution is still sought.

What is sought is a timing apparatus for independently driven and adjacent sickle cutting knives of a plant cutting machine which overcomes the problems, negative effects, and disadvantages and costs referenced above.

SUMMARY OF THE INVENTION

What is disclosed is a timing apparatus for independently driven and adjacent sickle cutting knives of a plant cutting machine which overcomes the problems, negative effects, and disadvantages and costs referenced above.

According to a preferred aspect of the invention, the timing apparatus is characterized by an endless elongate element encircling and movable about spaced apart support elements such that first and second portions of the elongate element span a space between the support elements, and connector elements connecting ends of the knives to the first and second portions of the elongate element, respectively, such that movement of the elongate element in a first direction about the support elements will move the knives in timed relation in first opposite cutting directions, and movement of the elongate element in a second direction opposite the first direction will move the knives in timed relation in second opposite cutting directions.

According to another preferred aspect of the invention, the elongate element comprises a chain and the support elements comprise sprockets, rotatable by movements of the chain. The movements of the chain can be effected by opposite driving movements of the knives by separate drives for just timing the movements, or by one of the knives for effecting the timed movements of the other knife in the opposite direction.

According to another preferred aspect of the invention, the elongate element and the support elements are contained in an enclosure mounted over rear portions of the knife ends, and can have a low profile shape, to facilitate flow of cut plant material about the enclosure. And, the connector elements can comprise elongate arms that extend from ends of the enclosure to the connection with the knife ends. Alternatively, the timing apparatus can be disposed directly over the sickle or rearwardly thereof, as desired or required for a particular application.

DETAILED DESCRIPTION OF THE INVENTION

Figure 1:
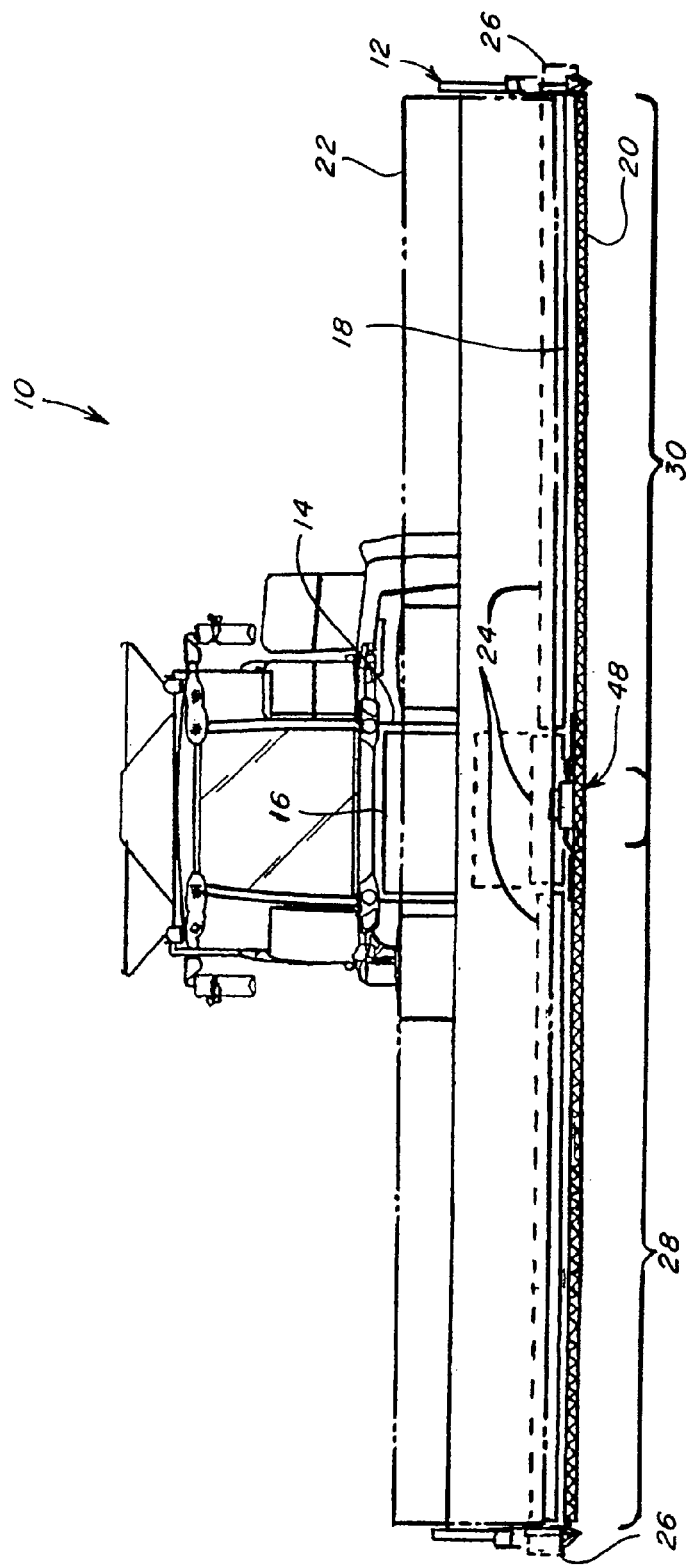
FIG. 1 is a front view of a plant cutting machine including timing apparatus of the invention connecting adjacent sickle knives of a sickle cutter of the machine.

Turning now to the drawings wherein preferred embodiments of the invention are shown, in FIG. 1, a conventional, well known agricultural plant cutting machine 10 which is a combine harvester, is shown including a conventional header 12 supported on a forward end 14 for cutting or severing crops such as, but not limited to, small grains such as wheat, and inducting the severed crops into a feeder 16 for conveyance into combine 10 for threshing and cleaning, in the well known manner as combine 10 moves forwardly over a field. Header 12 includes a floor 18 which is supported in close proximity to the ground surface of the field during the harvesting operation, and an elongate, sidewardly extending sickle 20 along a forward edge of floor 18 which severs the crop for induction into header 12. Header 12 additionally includes an elongate, sidewardly extending reel 22 disposed above floor 18 and rotatable in a direction for facilitating induction of the severed crops into header 12. Header 12 additionally includes a series of flat draper belts 24 which comprise a large portion of floor 18 and are operable for conveying the severed crops to feeder 16 for induction into the combine 10, in the well known manner. Alternatively, header 12 can include an auger (not shown) for conveying the cut crop to feeder 16, also in the well known manner. Header 12 additionally includes wobble drives 26 or other drive mechanisms on opposite ends, connected in driving relation to separate elongate sickle knives 28 and 30, respectively, which each comprise one-half of sickle 20, as will be discussed.

Figure 2:
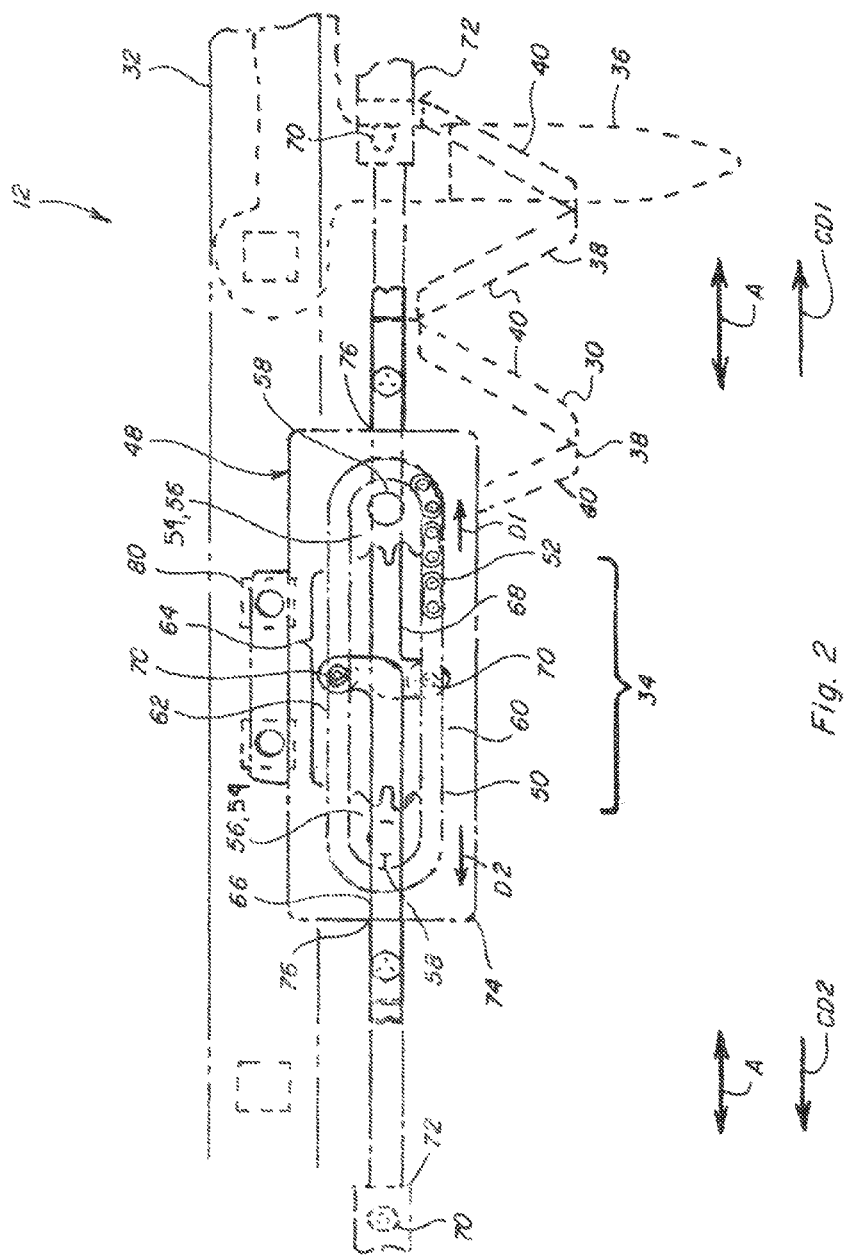
FIG. 2 is a simplified schematic top view of one of the timing apparatus.
Figure 3:
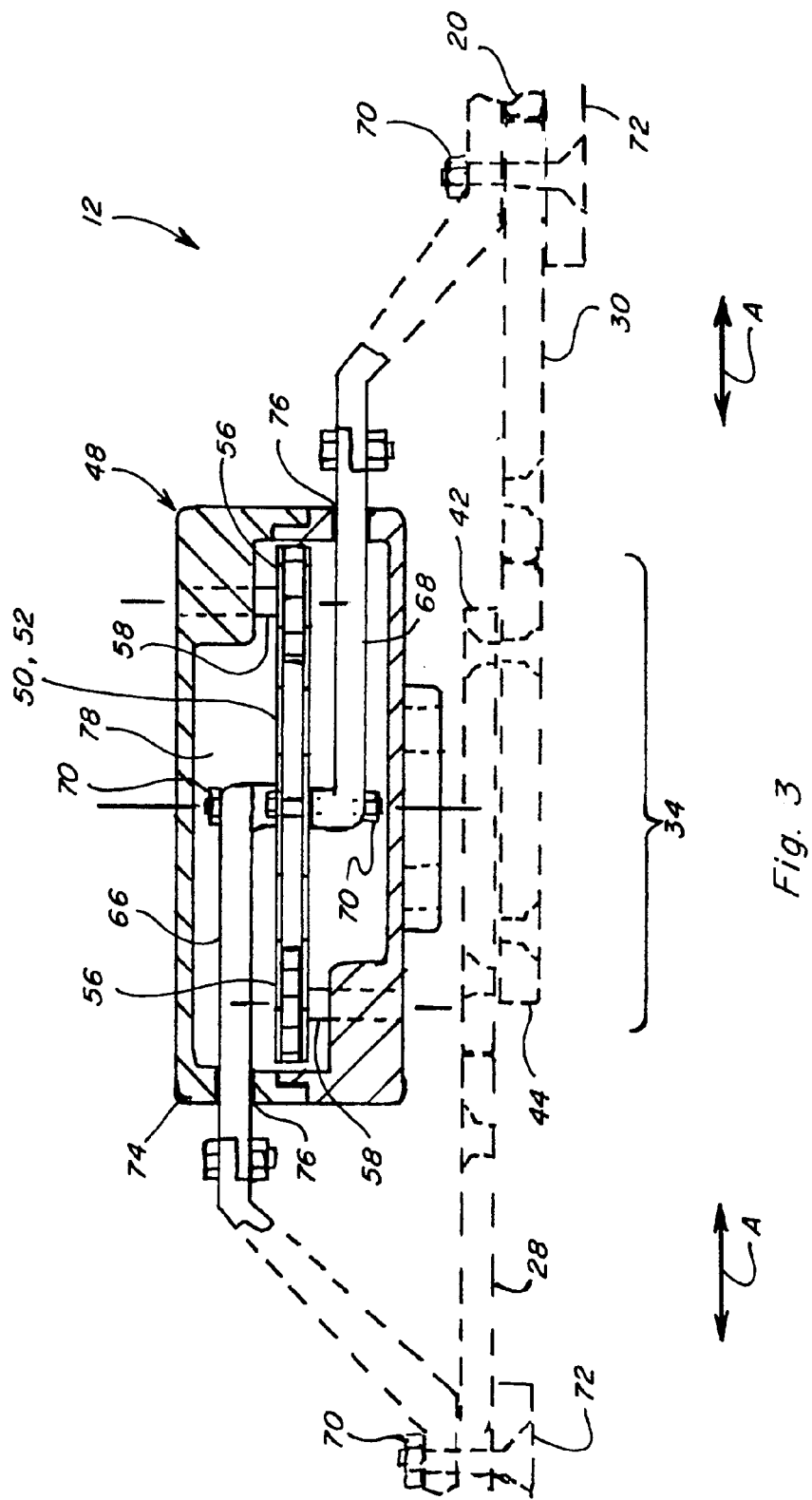
FIG. 3 is a simplified sectional view of one of the timing apparatus, showing internal aspects thereof, and showing the sickle knives schematically.

Referring also to FIGS. 2 and 3, sickle 20 extends in a sideward direction along the length of header 12 forwardly of a forward end portion 32 of header 12. Sickle knives 28 and 30 are supported in the well known manner so as to extend in substantially longitudinally aligned relation along respective halves of forward end portion 32, and so as to converge and overlap in a center region 34 of forward end portion 32. Knives are configured for sideward longitudinal movement relative to header 12, as denoted by arrows A, in the well known manner. Forward end portion 32 additionally supports a plurality of fixed, forwardly extending, spaced guards 36. Each sickle knife 28, 30 includes a row of knife sections 38 which extend through horizontal slots (not shown) through guards 36 for cutting any plant material between a knife section 38 and a guard 36 when the knife 28, 30 is moved as denoted by arrows A. In this regard, each knife section 38 includes angularly oriented serrated edges 40 which cut or sever the crops in cooperation with guards 36, again in the well known conventional manner.

In the present arrangement, knives 28 and 30 have knife ends 42 and 44 that overlap in center region 34. This is desirable as it provides a center cutting action centered in region 34, so that there is no gap in cutting across the width of header 12. An opposite end of each knife 28 and 30 is connected to an output of wobble drive 26 at its respective end of sickle 20 for effecting the cutting movements denoted by arrows A.

As noted above under the Background Art heading, it is desirable to reduce negative effects, including, but not limited to, vibration, fatigue failure, and the like, resulting from back and forth sideward motion of knives 28 and 30 in uncontrolled relation wherein at some times during the reciprocating action the knives 28 and 30 are moving in the same direction. This is achieved according to the present invention by utilizing timing apparatus 48 constructed and operable according to the teachings of the present invention, for connecting knives 28 and 30 together in timed, oppositely moving relation. Timing apparatus 48 includes an endless elongate element 50, which is preferably a chain 52, encircling and movable about spaced apart support elements 54, here sprockets 56, supported for rotation on generally upstanding shafts 58. As a result, first and second portions 60 and 62 of elongate element 50 span a space 64 between support elements 54 and are located on opposite sides thereof (forward and rear thereof). Connector elements 66 and 68, which are preferably elongate arms, connect to knife or backer bars 72 of knife ends 42 and 44, respectively, in a suitable manner, e.g., using threaded fasteners 70, and to the first and second portions 60 and 62 of elongate element 50, respectively, also in a suitable manner such as, but not limited to, using threaded fasteners 70. Connector elements 66 and 68 are configured here as elongate arms shaped to extend upwardly from knife ends 42 and 44 and include an elbow for attachment to portions 60 and 62 as illustrated, although other shapes and sizes can be used as desired or required for a particular application.

Referring more particularly to FIG. 2, as a result, movement of elongate element 50 in a first direction, denoted by arrow D1, about support elements 54 will move the knives 28 and 30 in timed relation in first opposite cutting directions CD1 and CD2, respectively, and movement of elongate element 50 in a second direction D2 opposite first direction D1 will move the knives 28 and 30 in timed relation in the opposite cutting directions, that is, in directions CD2 and CD1, respectively, so as to substantially reduce vibration output generated by operation of the sickle as a result of acceleration and deceleration of the knives. Here, the motions D1 and D2 will be effected by operation of wobble drives 26, timing apparatus 48 cooperating with those drives to achieve the opposite timed cutting movements. This is also possible if other drives such as fluid drives, belt drives, or the like, are used which allow the timing of their separate reciprocating actions.

Here also, timing apparatus 48 is enclosed in an enclosure 74 which is configure to have a low profile shape for relatively smooth flow cut crop material thereover. Enclosure 74 has end openings 76 for the passage of connector elements 66 and 68, but is otherwise preferably sealed. The interior 78 of enclosure 74 can contain a suitable lubricant, such as a grease or oil. Enclosure 74 is depicted as being locate over rear portions of knife ends 42, 44, and can be suitably mounted, for instance, using a rubber isolation mount 80 in connection with the forward end portion 32 of header 12 to reduce transmission of vibrations to the header.

Figure 4:
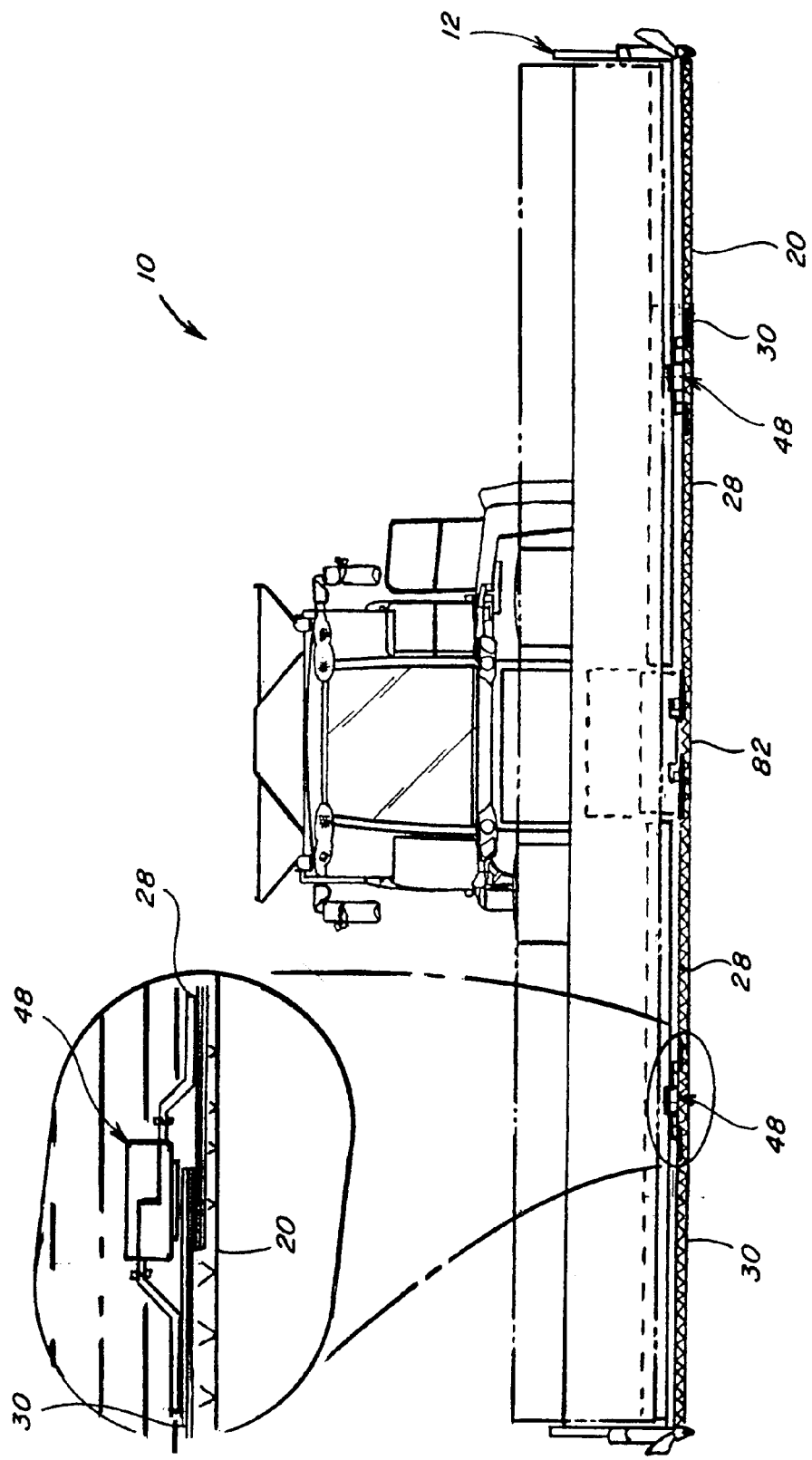
FIG. 4 is a front view of a plant cutting machine including several timing apparatus of the invention connecting adjacent sickle knives of a sickle cutter of the machine, and including a balloon enlargement showing one of the timing apparatus.

Referring also to FIG. 4, header 12 of machine 10 is shown including an alternative drive arrangement, which is a center reciprocating drive 82 configured and operable for oppositely driving sickle knives 28 connected thereto. Drive 82 can comprise a variety of epicyclical and other drive mechanisms operable to output linear reciprocating motion. The disclosures and teachings of Priepke U.S. Pat. Nos. 7,810,304; 7,805,919; 7,730,709; 7,520,118; and 7,401,458, are hereby incorporated by reference herein in their entireties, as representative non-limiting examples of drives and principles of operation that can be utilized with the present invention. In this embodiment, sickle knives 28 are connected in reciprocating timed relation to additional sickle knives 30, respectively, by timing apparatus 48 of the invention, to illustrate that apparatus 48 can be used for connecting sickle knives in timed driving relation also, wherein one of the connected knives drives the other knife, in essentially the above described vibration canceling reciprocating manner. Here, it can be noted that as an advantage when the timing apparatus of the invention is used only for separately driven sickle knives, less force is transmitted by the timing apparatus and thus components of the apparatus can be of less robust construction.

In light of all the foregoing, it should thus be apparent to those skilled in the art that there has been shown and described a novel timing apparatus for sickle knives. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A timing apparatus for separate sickle knives that have adjacent knife ends, respectively, comprising:
an endless elongate element encircling and movable about spaced apart idler support elements such that first and second portions of the endless elongate element span a space between the idler support elements, and
a pair of elongated connector elements aligned along a longitudinal axis of the endless elongate element, each having a first end attached to the endless elongate element and a remainder of the elongated connector element extending along an axis aligned with the longitudinal axis of the endless elongate element.

2. The timing apparatus of claim 1, wherein the timing apparatus is for knives that are at least generally parallel and the knife ends overlap.

3. The timing apparatus of claim 1, wherein the timing apparatus is for sickle knives of a plant cutting machine, driven from opposite ends by independent drive mechanisms.

4. The timing apparatus of claim 1, wherein the endless elongate element comprises a chain and the idler support elements comprise sprockets.

5. The timing apparatus of claim 1, wherein the endless elongate element and the idler support elements are contained in an enclosure for mounting over rear portions of the knife ends.

6. The timing apparatus of claim 1, wherein the timing apparatus is configured such that one of the knives is driven and another of the knives is driven by the one of the knives via the timing apparatus.

7. The timing apparatus of claim 1, wherein one of the elongated connector elements is attached to the first portion of the endless elongate element and the other elongated connector element is attached to the second portion of the endless elongate element.

8. The timing apparatus of claim 7, wherein the first and second portions are positioned diametrically opposed from each other.

9. The timing apparatus of claim 7, wherein each of the elongated connector elements has an elbow about the first end, and a longitudinal length of the elongated connector element is substantially parallel to the endless elongate element.

10. A timing apparatus including separate elongate sickle knives having adjacent knife ends, respectively, comprising:
an endless elongate element encircling and movable circumferentially about spaced apart driven support elements so as to span a space between the driven support elements and drive rotation of the driven support elements upon moving, and
connector elements connecting the knife ends to portions of the elongate element, respectively, between the driven support elements and in a manner such that movement of the elongate element in a first direction about the driven support elements will move the knives in timed relation in first opposite cutting directions, and movement of the elongate element in a second direction opposite the first direction will move the knives in timed relation in second opposite cutting directions.

11. The timing apparatus of claim 10 wherein the knives are at least generally parallel and the knife ends overlap.

12. The timing apparatus of claim 10, wherein the knives comprise sickle knives of a plant cutting machine, driven from opposite ends by independent drive mechanisms.

13. The timing apparatus of claim 10, wherein the elongate element comprises a chain and the driven support elements comprise sprockets.

14. The timing apparatus of claim 10, wherein the elongate element and the driven support elements are contained in an enclosure mounted over rear portions of the knife ends.

15. The timing apparatus of claim 14, wherein one of the knives is driven and another of the knives is driven by the one of the knives, via the timing apparatus.

16. A sickle assembly for a plant cutting machine comprising:
sickle knives having adjacent knife ends;
a drive mechanism for driving reciprocal motion of the sickle knives; and
a timing apparatus operatively engaged with the sickle knives, the timing apparatus including:
an endless chain encircling and movable circumferentially about spaced apart rotatable sprockets so as to span a space between the sprockets, and
connector arms connecting the knife ends to opposite portions of the chain at locations between the sprockets, respectively, such that movement of the chain in a first direction about the sprockets will move the knives in timed relation in first opposite cutting directions, and movement of the chain in a second direction opposite the first direction will move the knives in timed relation in second opposite cutting directions.

17. The sickle assembly of claim 16 wherein the knives are at least generally parallel and the knife ends overlap.

18. The sickle assembly of claim 16, wherein the knives are driven from opposite ends by the drive mechanism.

19. The sickle assembly of claim 16, wherein the chain and the sprockets are contained in an enclosure mounted adjacent to rear portions of the knife ends.

20. The sickle assembly of claim 19, wherein one of the sickle knives is reciprocatingly driven from an opposite end thereof by the drive mechanism, for driving another of the sickle knives via the timing apparatus.

* * * * *